US009326077B2

(12) United States Patent
Sommer et al.

(10) Patent No.: US 9,326,077 B2
(45) Date of Patent: *Apr. 26, 2016

(54) SYSTEM AND METHOD FOR SHARING NETWORK RESOURCES BETWEEN HEARING DEVICES

(71) Applicant: OTICON A/S, Smorum (DK)

(72) Inventors: Peter Sommer, Smorum (DK); Carsten Trygve Bogh, Smorum (DK)

(73) Assignee: OTICON A/S, Smørum (DK)

( * ) Notice: Subject to any disclaimer, the term of this patent is extended or adjusted under 35 U.S.C. 154(b) by 348 days.

This patent is subject to a terminal disclaimer.

(21) Appl. No.: 13/838,889

(22) Filed: Mar. 15, 2013

(65) Prior Publication Data
US 2013/0272554 A1 Oct. 17, 2013

Related U.S. Application Data

(62) Division of application No. 11/919,750, filed on Jan. 17, 2008, now Pat. No. 8,452,036.

(30) Foreign Application Priority Data

May 3, 2005 (EP) ..................................... 05103686
May 2, 2006 (WO) ................. PCT/EP2006/061964

(51) Int. Cl.
*H04R 25/00* (2006.01)
*H04M 1/725* (2006.01)
(Continued)

(52) U.S. Cl.
CPC ............ *H04R 25/554* (2013.01); *H04L 67/125* (2013.01); *H04L 67/34* (2013.01);
(Continued)

(58) Field of Classification Search
CPC ...... H04R 25/50; H04R 25/505; H04R 25/55; H04R 25/554; H04R 25/558; H04R 2225/41; H04R 2225/55; H04R 2460/07; H04M 1/05; H04M 1/6066; H04M 1/72591
USPC .............. 381/60, 312, 314, 315, 323; 600/25; 607/55, 56, 57
See application file for complete search history.

(56) References Cited

U.S. PATENT DOCUMENTS 5,497,426 A  3/1996 Jay
6,438,245 B1  8/2002 Taenzer et al.
(Continued)

FOREIGN PATENT DOCUMENTS

DE  102 22 408 A1  11/2003
EP  1 460 769 A1  9/2004
(Continued)

*Primary Examiner* — Huyen D Le
(74) *Attorney, Agent, or Firm* — Birch, Stewart, Kolasch & Birch, LLP

(57) ABSTRACT

A system for enabling a hearing device wireless access to a communication network includes a first transceiver unit in the hearing device communicating according to a first communication protocol. The system also includes a server device including an input/output unit connected to the communication network and configured to communicate according to a second communication protocol. A second transceiver unit is connected wirelessly to the first transceiver unit and configured to communicate according to the first communication protocol. A translator unit interconnects the second transceiver unit and the input/output unit and is configured to translate between the first and second communication protocol. The hearing device is configured to upload and download data to and from the communication network through the server device, and the server device is incorporated in a mobile or cellular telephone.

12 Claims, 2 Drawing Sheets

(51) Int. Cl.
*H04L 29/08* (2006.01)
*H04L 29/06* (2006.01)
*H04M 1/05* (2006.01)
*H04M 1/60* (2006.01)

(52) U.S. Cl.
CPC ............ *H04L 69/08* (2013.01); *H04M 1/7253* (2013.01); *H04R 25/55* (2013.01); *H04M 1/05* (2013.01); *H04M 1/6066* (2013.01); *H04M 1/72591* (2013.01); *H04R 2225/41* (2013.01); *H04R 2225/55* (2013.01); *H04R 2460/07* (2013.01)

(56) References Cited

U.S. PATENT DOCUMENTS

| | | |
|---|---|---|
| 6,850,775 B1 | 2/2005 | Berg et al. |
| 2002/0071581 A1 | 6/2002 | Leysieffer et al. |
| 2003/0044033 A1 | 3/2003 | Julstrom et al. |
| 2003/0064746 A1 | 4/2003 | Rader et al. |
| 2004/0147279 A1 | 7/2004 | Busch |
| 2004/0224703 A1 | 11/2004 | Takaki et al. |
| 2005/0283263 A1 | 12/2005 | Eaton et al. |
| 2006/0182294 A1 | 8/2006 | Grasbon et al. |
| 2007/0009124 A1* | 1/2007 | Larsen .......................... 381/315 |
| 2010/0208922 A1* | 8/2010 | Erni et al. ...................... 381/315 |

FOREIGN PATENT DOCUMENTS

| | | |
|---|---|---|
| WO | WO 96/41498 A1 | 12/1996 |
| WO | WO 99/03254 A1 | 1/1999 |
| WO | WO 01/26420 A2 | 4/2001 |
| WO | WO 0154458 A2 | 7/2001 |
| WO | WO 03/026349 A1 | 3/2003 |

* cited by examiner

SYSTEM AND METHOD FOR SHARING NETWORK RESOURCES BETWEEN HEARING DEVICES

CROSS REFERENCE TO RELATED APPLICATIONS

This application is a Divisional of copending application Ser. No. 11/919,750 filed on Jan. 17, 2008, which is a National Phase of PCT International Application No. PCT/EP2006/061964 filed on May 2, 2006. This Application claims priority of Application No. EP 05103686.1 filed on May 3, 2005. The entire contents of all of the above applications are hereby incorporated by reference.

FIELD OF INVENTION

This invention relates to a system and method for sharing network resources between hearing devices. In particular, this invention relates to a communications network enabling one or more hearing devices to access shared services. This invention further relates to a gateway device enabling hearing devices and user's thereof to utilise the system for sharing resources.

BACKGROUND OF INVENTION

Wireless communication between a pair of hearing aids and various electrical appliances is known from European patent application no.: EP 1 460 769. This patent application discloses a mobile transceiver comprising a number of receivers receiving electrical or electro-magnetic signals carrying audio signals. The mobile transceiver further comprises a prioritising module assigning a priority to audio signals received by the receivers so as to ensure that essential information is communicated before general information. In one embodiment of the mobile transceiver comprises a positioning means determining current geographic position and the prioritising module is designed to assign a priority value to a received audio signal according to determined current geographic position.

Further, German patent application no.: DE 102 22 408, discloses a hearing aid system with a radio interface enabling communication with external household appliances. The disclosed system enables a plurality of hearing aid users to connect through their hearing aids to a communication bus for individually controlling household appliances through the communication bus. The hearing aids connect wirelessly to the communication bus and receive status information from the household devices, such as "incoming telephone call" or "heating on". The hearing aids in addition may transmit control signals to the household devices by depression of button on hearing aids or by vocal control.

Even though the above hearing aid systems provide extended possibilities for the hearing impaired, further advances may be achieved. For example, the problem still remains in providing a wirelessly communicating module or unit within the limited space of a hearing aid. This problem is not addressed in the above patent applications, and therefore the hearing aids in the context of the above referred systems still require physical add-on technology.

SUMMARY OF THE INVENTION

An object of the present invention is therefore to provide a hearing device system overcoming the above problems by providing a wireless communication between a plurality of hearing devices and a communications network.

A particular advantage of the present invention is the provision of access to common services for hearing devices, such as updating hearing aid software with new features, accessing a multimedia event, or accessing service information.

A particular feature of the present invention is the provision of a gateway translating from a hearing devices protocol to a communication specific protocol and from a communication specific protocol to a hearing device protocol.

The above object, advantage and feature together with numerous other objects, advantages and features, which will become evident from below detailed description, are obtained according to a first aspect of the present invention by a system for enabling a hearing device wireless access to a communication network, and comprising a first transceiver unit in said hearing device communicating according to a first communication protocol; a server device comprising an input/output unit connected to said communication network and adapted to communicate according to a second communication protocol, a second transceiver unit connected wirelessly to said first transceiver unit and adapted to communicate according to said first communication protocol, and a translator unit interconnecting said second transceiver unit and said input/output unit and adapted to translate between said first and second communication protocol; and wherein said hearing device is adapted to upload and download data to and from said communication network through said server device.

The term "a" or "an" is in this context to be construed as one or more, a plurality, or a multiplicity of parts.

Further, the term "hearing device" is in this context to be construed as a hearing aid, a headset, a headphone, an ear-level hearing device, or any combinations thereof.

Additionally, the term "server device" is in this context to be construed as a personal device for handling a single hearing device as well as a shared device for handling a number of hearing devices. That is, the server device may be a body worn mobile device or a stationary public device.

The system according to the first aspect of the present invention provides further advances in communication possibilities for hearing devices and, in particular, for hearing impaired using hearing devices. The system enables a user of the hearing device to access and download data from, for example, the Internet or a local area network. Thus the communication network may comprise a wired or wireless telephone network, such as public switched telephone network (PSTN), global system for mobile communication (GSM), enhanced data GSM environment (EDGE), digital enhanced cordless telecommunications (DECT), a computer network, such as dedicated line, a local area network (LAN), a metropolitan area network (MAN), wide area network (WAN), an inter-network (e.g. the Internet), a media network, such as a cable or satellite television or radio network, or any combination thereof. Thus the communication network may advantageously comprise a wide variety of network compositions, which enable audio as well control communication to the hearing device.

The data according to the first aspect of the present invention may comprise a data package, such as digital data configured in a transmission block, a data packet, a data parcel, datagram, and the like. The data package may have a first configuration for the communication between the first and second transceiver units and a second configuration for the communication on the communications network.

The data package according to the first aspect of the present invention may comprise a header section comprising routing and transmission control data, such as transmitting and receiving addresses, and a data section comprising data payload. Hence the data package may be self-contained, independent entity of data carrying information to be routed from the hearing device to the server device or from the server device to the hearing device without reliance on earlier exchanges.

The wireless communication between the first and second transceiver elements may be implemented by capacitive or inductive coupling. The wireless communication may further be implemented using a modulation technique, a multiplexing technique, a coding technique, or any combination thereof. The wireless communication may comprise frequency modulation (FM), amplitude modulation (AM), code-division multiple access (CDMA), phase shift keying (PSK), or any combination thereof. The first and second transceiver elements may comprise a coil antenna, so as to provide means for communicating inductively between a coil antenna of the first transceiver element and a coil antenna of the second transceiver element.

The first communication protocol according to the first aspect of the present invention may comprise Bluetooth, CDMA protocol, proprietary wireless link protocol, or any combination thereof.

The communication between the first and second transceiver elements may be accomplished in a high frequency range, such as between 800 MHz to 3 GHz. Thus the first and second transceiver element may each comprise a modulator and a demodulator adapted to transform data to high frequency signals communicated between the first and second transceiver. The first and second transceiver element may further each comprise a CODEC adapted to generate said data package. The term "CODEC" is in this context to be construed as an encoder/decoder and/or a compressor/de-compressor.

The second communication protocol according to the second aspect of the present invention may comprise CDMA, stream control transmission protocol (SCTP), telephone system's signalling system 7 (SS7), transmission control protocol/Internet protocol (TCP/IP), serial line Internet protocol (SLIP), point-to-point protocol (PPP), user datagram protocol (UDP), Internet control message protocol (ICMP), interior gateway protocol (IGP), exterior gateway protocol (EGP), border gateway protocol (BGP), or any combination thereof. Further, the second communication protocol may comprise Bluetooth, $I^2C$, proprietary wireless link protocol, or any combination thereof. Hence the second communication protocol may encompass the task of handling all required network operations being general, telephone-related, computer-related, or any combinations thereof, such as IP telephony.

The server device according to the first aspect of the present invention may comprise memory element adapted to buffer said data to be up- and downloaded on said communication network. The server device may comprise access to a plurality of service providers in the communication network. The service providers advantageously provide all types of services for the hearing device users. For example, the service providers may provide updated hearing aid software with new features, access to a multimedia event, access service information, or any combination thereof. In addition, the server unit may comprise access to a telephone, such as a mobile or cellular telephone or a wired PSTN telephone, a computer, a personal digital assistant, a television, or any combination thereof.

The server device according to the first aspect of the present invention may further comprise a location identifying element adapted to identify present location of the server device. The location identifying element may thus advantageously identify a location of the server device, which location may include associations to particular hearing device programs. The term "program" is in this context to be construed as a setting of the hearing device determining the gain transfer function. The gain transfer function may be established according to a particular hearing loss or impairment or may be established according to a particular acoustic environment. Hence the location identifying element may assist in selecting an appropriate program for a hearing aid communicating with the server or, in fact, to a plurality of hearing aids communicating with the server device.

The server device according to the first aspect of the present invention may be incorporated in a mobile or cellular telephone. Thus the location identifying element may utilise triangulation for determining location of the server device. Alternatively, the server device may comprise a global positioning system (GPS) module adapted to determine the location of the server device.

The server device according to the first aspect of the present invention may be fixed at a permanent location, such as an airport, an aeroplane, a bus, a train, a cinema and the like. Thus the server device may be utilised for controlling one or more hearing devices in the same location with common external noise reduction schemes. That is, the server device may ensure that hearing aids in an aeroplane are controlled so as to reduce the noise experienced by the wearer of the hearing device. Similarly, the server device may also provide audio from the in-flight video as well as service messages to the wearer of the hearing device.

The hearing device according to the first aspect of the present invention may further comprise an acoustic environment detector adapted to generate an environment signal to be forwarded as data payload in a data package to an environment service provider in the communication network. The environment signal may comprise amplitude and frequency data relating to acoustic background noise of location of hearing device. The environment service provider may comprise a controller element adapted to generate an environment compensation signal to be forwarded as data payload in a data package to the hearing device. The hearing device may be adapted to utilise the environment compensation signal for increasing signal-to-noise ratio of an audio signal presented to the user of the hearing device. The environment compensation signal may comprise a phase shifted version of the environment signal. Hence the environment service provider may utilise the environment signal for generating a phase shifted copy to be incorporated in the audio signal presented to the user of the hearing device so as to mask the acoustic background noise. The environment service provider according to the first aspect of the present invention may comprise an environment bank memory adapted to store a number of environment compensation signals each associated with a predefined noise situation.

The server device according to the first aspect of the present invention may incorporate the environment service provider. Thus the server device may establish a stand alone service for hearing devices connecting thereto. Further, the server device may comprise a broadcasting element adapted to broadcast to any hearing devices in a predefined area of the location of the server device. Thus the environment compensation signal may be utilised for reducing background noise, for example, in an aeroplane for passengers wearing hearing devices.

The above objects, advantages and features together with numerous other objects, advantages and features, which will become evident from below detailed description, are obtained according to a second aspect of the present invention by a server device adapted to operate in the system according to the first aspect of the present invention.

The server device according to the second aspect of the present invention may incorporate any features of the system and in particular the server device according to the first aspect of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF PREFERRED EMBODIMENTS

In the following description of the various embodiments, reference is made to the accompanying figures, which show by way of illustration how the invention may be practiced. It is to be understood that other embodiments may be utilised and structural and functional modifications may be made without departing from the scope of the present invention.

Figure 1:
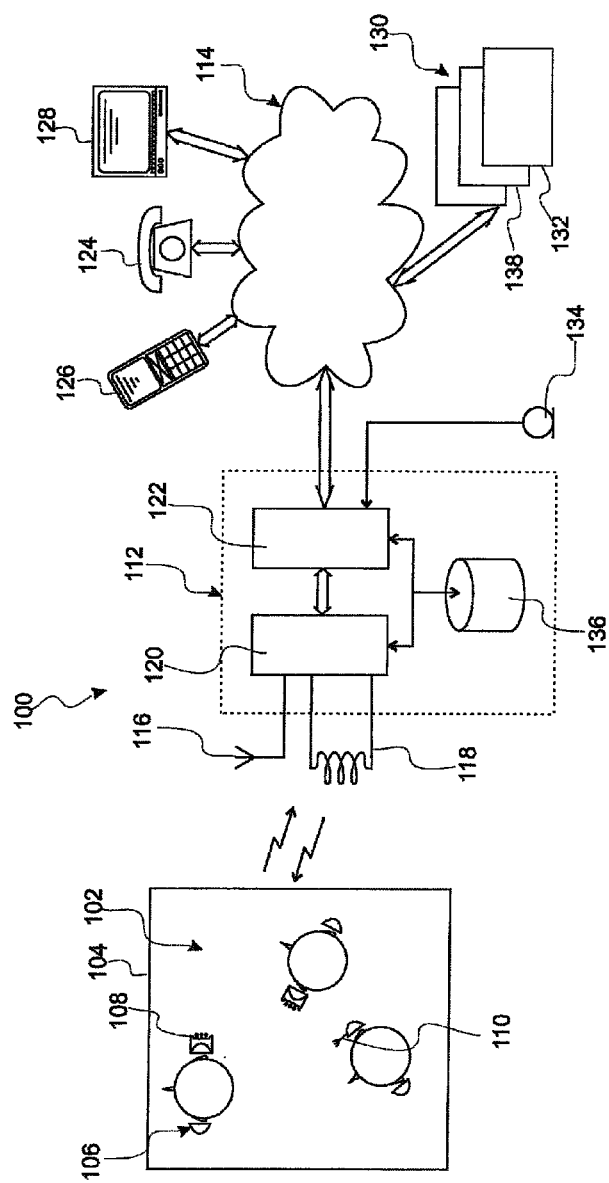
FIG. 1, shows a system according to a first embodiment of the present invention.

FIG. 1, shows a system according to a first embodiment of the present invention, which is designated in entirety by reference numeral 100. The system 100 comprises one or more wearers of hearing devices 102 in a defined area 104.

The hearing devices are designated in entirety by reference numeral 106 and are shown in FIG. 1 as three sets of hearing devices. The hearing devices 106 may be headsets, headphones, hearing aids, or any combination thereof.

Each of the hearing devices 106 comprises an antenna, which may be an inductive coil 108 or a dipole antenna 110. The antenna 108, 110 enable the hearing devices 106 to receive and transmit signals with a server 112. The server 112 enables each of the connecting hearing devices 106 to access a communications network 114, which may comprise a computer network, media network, telecommunications network, or any combinations thereof.

The server 112 comprises one or more antennas 116, 118 for transmitting and receiving data from the hearing devices 106, which data are configured according to a wireless proprietary protocol especially developed for hearing devices in particular hearing aids. The server 112 comprises a gateway unit 120 for converting data from the antennas from the wireless proprietary protocol to a general communications protocol. The general communications protocol may comprise CDMA, SCTP, SS7, TCP/IP, SLIP, PPP, UDP, ICMP, IGP, EGP, BGP, Bluetooth, I²C, a second proprietary protocol, or in fact any combination thereof.

The term "gateway" is in this context to be construed as a translator translating from one transmission configuration and/or data configuration to another.

The server 112 further comprises an input/output (I/O) unit 122 for connecting to the communications network 114. The I/O unit 122 thus may connect to a wide variety of services in the communication network 114, such as a public switched telephone 124, a cellular or mobile telephone 126, or a computer 128. In addition the communications network 114 comprises access to a plurality of services provided by service providers 130. The service provides 130 comprise an environment service provider 132 for reducing background noise experienced by the hearing devices 106.

The hearing devices 106 comprise acoustic environment detectors generating environment signals forwarded as a data payload in a data package to the environment service provider 132 in the communication network 114. The environment signals comprise amplitude and frequency data relating to acoustic background of hearing devices 106.

Further, the I/O unit 122 of the server 112 connects to a microphone 134, which may be applied as a further acoustic environment detector for commonly determining the acoustic environment of the defined area 104. The server 112 generates an environment signal based on the acoustic environment of the defined area 104, and forwards the environment signal as a data payload in a data package to the environment service provider 132.

The environment service provider 132 generates an environment compensation signal based on the environment signals, which environment compensation signal is forwarded as a data payload in a data package to the hearing devices 106. The hearing devices 106 utilise the environment compensation signal for increasing signal-to-noise ratio of an audio signal presented to the wearers 102 of the hearing devices 106.

The environment compensation signal comprises a phase shifted version of the environment signal. Hence the environment service provider 132 may utilise the environment signal for generating a phase shifted copy to be incorporated in the audio signal presented to the wearers 102 of the hearing devices 106 so as to mask the acoustic background noise.

In a further embodiment of the present invention the microphone 134 is used for categorising the acoustic environment of the position of the microphone 134. The server 112 uses this categorisation for broadcasting a control signal to the hearing devices 106 in the defined area 104.

The server 112 further comprises a memory 136 wherein the server 112 stores signal processing settings controlling the signal processing of the hearing devices 106. The server 112 may thus firstly determine an acoustic environment of the defined area 104 and broadcast a setting to the hearing devices 106, which setting processes the sound in accordance with the acoustic environment.

Similarly, the communications network 114 comprises a storage provider 138 operable by the server 112 to store and communicate an appropriate setting to the hearing devices 106.

Figure 2:
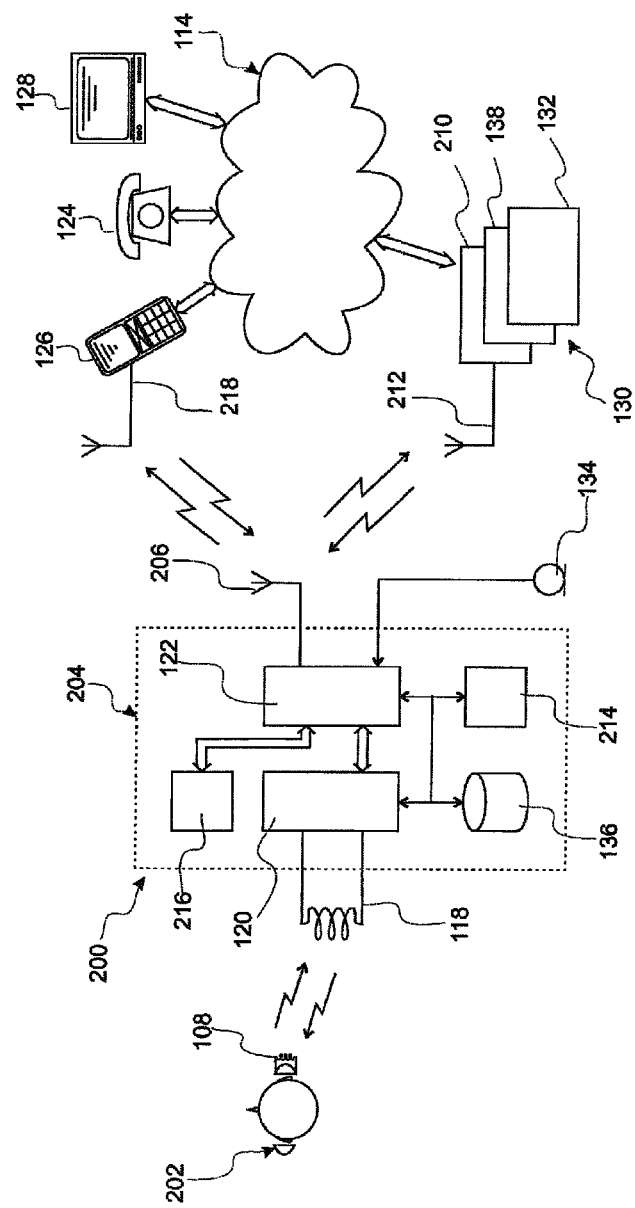
FIG. 2, shows a system according to a second embodiment of the present invention.

FIG. 2 shows a system according to a second embodiment of the present invention and designated in entirety by reference numeral 200. Elements described with reference to FIG. 1 having an identical function are designated with the same reference numeral in FIG. 2.

The system 200 comprises a hearing device 202 communicating with a personal server 204 through antennas 108, 118. The personal server 204 further comprises a second antenna 206 enabling wireless communication with a wireless access service provider 210 connecting to the communication network 114. The wireless access service provider 210 communicates with the personal server 204 through an antenna 212. The personal server 204 has a size, which makes it particularly advantageous as a body-worn device.

The wireless access service provider 210 thus enables the hearing device access to a wide variety of service provided on the communication network 114. For example, the hearing device may receive audio streams of travel information, position data, or media content (e.g. radio or sound track of television).

As in the server 112, described with reference to FIG. 1, the personal server 204 comprises a memory 136, which may be utilised storing hearing device 202 specific data such as environmental acoustic data logged during a period, and the wearer's reactions to the hearing device's selections of programs in certain acoustic environments. Further, the personal server 204 comprises a processor 214 adapted to assist and/or support a signal processor of the hearing device in calculations performed on the environmental acoustic data.

The personal server 204 comprises a user interface (UI) 216 allowing the wearer of the hearing device 202 to control the hearing device 202 and allowing the wearer to control access to the communication network 114. The UI 216 may comprise a display and keypad for displaying either services provided by the service providers 130 in the communication network 114 or explanatory information from the operation of the hearing device 202.

The second antenna 206, in a further embodiment of the present invention, connects directly to cellular or mobile phone 126 through antenna 218. In this embodiment of the present invention, the personal server 204 utilises the cellular or mobile phone 126 for accessing the communication network 114.

In a third embodiment of the present invention, the personal server 204 is incorporated in the cellular or mobile phone 126, thus enabling accesses to the service providers 130 or devices 124, 128 connecting to the communication network 114 by means of the cellular or mobile phone 126. The cellular or mobile phone 126 incorporates all the features of the server 112 and personal server 204, described with reference to the figures.

The second and third embodiments of the present invention advantageously may thus provide a wearer of a hearing device such as a hearing aid with positioning information, audio streaming etc. In addition, the second and third embodiment may provide an improved user interface for a wearer of a hearing device such as a hearing aid since the wearer is presented with a display and keypad, either directly on the personal server 204 or indirectly on the cellular or wireless phone 126.

The second and third embodiments of the present invention may further advantageously utilise the microphone 134 as a conference microphone recording the voice of the wearer and transmitting the voice to other wearers of hearing devices.

Finally, the first, second and third embodiments of the present invention may support the hearing devices 106 in signal processing, for example, in accordance with a hearing impairment, and in calculation of features such as directionality of acoustic signal detected by the hearing devices 106 or noise reduction schemes.

The invention claimed is:

1. A system for enabling a hearing device wireless access to a communication network, and comprising:
 a first transceiver unit in said hearing device communicating according to a first communication protocol;
 a server device including
  an input/output unit connected to said communication network and adapted to communicate according to a second communication protocol,
  a second transceiver unit connected wirelessly to said first transceiver unit and adapted to communicate according to said first communication protocol,
  a translator unit interconnecting said second transceiver unit and said input/output unit and adapted to translate between said first and second communication protocol, and
  a memory configured to store environmental acoustic data and actions of a wearer of the hearing device,
 wherein the hearing device is configured to select programs in certain acoustic environments and the server device is configured to store in the memory the wearer's reactions to the hearing device's selection of programs in said certain acoustic environments,
 wherein said hearing device is adapted to upload and download data to and from said communication network through said server device, and
 wherein said server device is incorporated in a mobile or cellular telephone.

2. A system according to claim 1, wherein
 said communication network comprises a wired or wireless telephone network, a computer network, media network, or any combination thereof.

3. A system according to claim 1, wherein
 said data comprises a data package.

4. A system according to claim 3, wherein
 said data package comprises a header section comprising routing and transmission control data, and a data section comprising data payload.

5. A system according to claim 1, wherein
 said communication network comprises connections to a plurality of service providers in said communication network.

6. A system according to claim 5, wherein
 said service providers are adapted to provide at least one of types of services for the hearing device users, including updated hearing aid software with new features,
 access to a multimedia event,
 access service information, and
 any combination thereof.

7. A system according to claim 1, wherein
 said communication network further includes connections to a telephone, a computer, a personal digital assistant, a television, or any combination thereof.

8. A system according to claim 1, wherein
 said server device further comprises a location identifying element adapted to identify present location of the server device.

9. A system according to claim 1 configured for updating hearing aid software of the hearing device with new features.

10. A system according to claim 1 wherein the server device comprises a processor adapted to assist and/or support a signal processor of the hearing device in calculations performed on the environmental acoustic data.

11. A system according to claim 1 wherein the communications network comprises a storage provider operable by the server to store and communicate an appropriate setting to the hearing devices.

12. A system for enabling a hearing device wireless access to a communication network, and comprising:
 a first transceiver unit in said hearing device communicating according to a first communication protocol;
 a server device including
  an input/output unit connected to said communication network and adapted to communicate according to a second communication protocol,
  a second transceiver unit connected wirelessly to said first transceiver unit and adapted to communicate according to said first communication protocol,
  a translator unit interconnecting said second transceiver unit and said input/output unit and adapted to translate between said first and second communication protocol, wherein said hearing device is adapted to upload and download data to and from said communication network through said server device, wherein said server device is incorporated in a mobile or cellular telephone and includes a microphone, and the server device is configured to record the voice of a wearer of said hearing device using the microphone and to transmit the recorded voice to other wearers of hearing devices.

* * * * *

UNITED STATES PATENT AND TRADEMARK OFFICE
CERTIFICATE OF CORRECTION

Page 1 of 1

PATENT NO. : 9,326,077 B2
APPLICATION NO. : 13/838889
DATED : April 26, 2016
INVENTOR(S) : Peter Sommer et al.

It is certified that error appears in the above-identified patent and that said Letters Patent is hereby corrected as shown below:

ON THE TITLE PAGE:

At item (62), correct the Related U.S. Application Data to read as follows:

--Division of application No. 11/919,750, filed as application No. PCT/EP2006/061964 on May 2, 2006, now Pat. No. 8,452,036.--.

At item (30), Foreign Application Priority Data, delete the following:

"May 2, 2006   (WO)   .........................   PCT/EP2006/061964".

Signed and Sealed this
Nineteenth Day of July, 2016

Michelle K. Lee
*Director of the United States Patent and Trademark Office*